US012667947B2

(12) United States Patent
Yasutomi et al.

(10) Patent No.: US 12,667,947 B2
(45) Date of Patent: Jun. 30, 2026

(54) WORK MACHINE

(71) Applicant: KOKI HOLDINGS CO., LTD., Tokyo (JP)

(72) Inventors: Toshinori Yasutomi, Ibaraki (JP); Tatsuhiro Tago, Ibaraki (JP)

(73) Assignee: Koki Holdings Co., Ltd., Tokyo (JP)

(*) Notice: Subject to any disclaimer, the term of this patent is extended or adjusted under 35 U.S.C. 154(b) by 140 days.

(21) Appl. No.: 18/291,857

(22) PCT Filed: Mar. 25, 2022

(86) PCT No.: PCT/JP2022/014716

§ 371 (c)(1),
(2) Date: Jul. 30, 2024

(87) PCT Pub. No.: WO2023/032331

PCT Pub. Date: Mar. 9, 2023

(65) Prior Publication Data

US 2025/0128390 A1 Apr. 24, 2025

(30) Foreign Application Priority Data

Aug. 31, 2021 (JP) ................................ 2021-141735

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .. B25C 1/047; B25C 1/06; B25C 1/04; B25C 1/008; B25C 1/041; B25C 1/043; B25C 1/042; B25C 1/046
See application file for complete search history.

(56) References Cited

U.S. PATENT DOCUMENTS

2020/0406439 A1 12/2020 Fujimoto et al.
2021/0245345 A1 8/2021 Ueda et al.

FOREIGN PATENT DOCUMENTS

JP 2018-69389 A 5/2018
WO 2018-042981 A1 3/2018
(Continued)

OTHER PUBLICATIONS

Ootsuka, Machine Translation of WO 2019235178 A1, 2019 (Year: 2019).*
(Continued)

*Primary Examiner* — Veronica Martin
(74) *Attorney, Agent, or Firm* — RIMON P.C.

(57) ABSTRACT

The present invention improves workability. In a driving machine, a valve mechanism is provided at a top wall of a pressure storage container. The valve mechanism has a valve for replenishing air in a pressure chamber. The valve is inserted from an upper side into a communication passageway formed in the pressure storage container and is attached to a valve attaching portion of the communication passageway. The valve mechanism has a valve stopper, and the valve stopper is disposed at the upper side of the valve and presses a valve core downward. In other words, the valve stopper regulates upward movement of the valve core (valve). Therefore, the attachment state of the valve can be favorably maintained, and the workability of the driving machine can be improved.

20 Claims, 12 Drawing Sheets

(56) References Cited

FOREIGN PATENT DOCUMENTS

| | | | | | |
|---|---|---|---|---|---|
| WO | 2019-208102 | A1 | | 10/2019 | |
| WO | WO-2019235178 | A1 | * | 12/2019 | ............. B25C 1/043 |
| WO | 2021-192838 | A1 | | 9/2021 | |

OTHER PUBLICATIONS

International Search Report received in PCT Application No. PCT/JP2022/014716, dated Jun. 14, 2022.

* cited by examiner

WORK MACHINE

CROSS-REFERENCE TO RELATED APPLICATIONS

This application is the U.S. National Phase under 35 U.S.C. § 371 of International Application No. PCT/JP2022/014716, filed on Mar. 25, 2022, which claims the benefit of foreign priority to Japanese Patent Application No. 2021-141735 filed on Aug. 31, 2021, the entire contents of each of which are hereby incorporated by reference.

BACKGROUND OF THE INVENTION

1. Field of the Invention

The present invention relates to a work machine.

2. Description of the Related Art

A driving machine (work machine) described in patent literature 1 below has a valve in a pressure storage container whose inside is configured as a pressure chamber, and the valve shuts off the inside of the pressure storage container from outside to maintain an airtight condition of the pressure chamber. By moving a valve plug of the valve by operation of an operator, a shut-off state by the valve is released and the inside of the pressure storage chamber and the outside are connected. This allows gas in the pressure chamber to be discharged from the valve or the gas to be replenished into the pressure chamber.

RELATED ART LITERATURE

Patent Literature

[Patent Literature 1]
International Publication WO2018/042981.

SUMMARY OF THE INVENTION

Disclosure of the Invention

Problem to be Solved by the Invention

There is room for improvement in the above-mentioned driving machine in following points. In the above driving machine, the valve plug of the valve may move relative to a valve core due to vibration generated during a driving operation, and the gas in the pressure chamber may leak from the valve to the outside of the pressure storage container. In addition, the vibration generated during the driving operation may loosen a fixation of the valve core to the pressure storage container, causing the gas in the pressure chamber to leak from the valve to the outside of the pressure storage container. Therefore, to prevent leakage of the gas in the pressure chamber to the outside, maintenance work on the valve and other parts must be performed periodically, which reduces workability of the driving machine.

Considering the above facts, the present invention aims to provide the work machine that can improve the workability.

Means to Solve the Problem

At least one embodiment of the present invention is a work machine comprising: a pressure storage container with a pressure chamber inside that is filled with gas: a striker that strikes a fastener by moving due to a pressure of the gas in the pressure chamber: a communication passageway formed in the pressure storage container and made to communicate with outside and inside of the pressure storage container: a valve attached to the communication passageway configured to shut off a communication between the outside and the inside of the pressure storage container and to switch to a communication state that communicates between the outside and the inside of the pressure storage container; and a switching inhibition mechanism provided in the pressure storage container and maintains the valve in an inactive state and inhibits the valve from switching to the communication state.

At least one embodiment of the present invention is the work machine, wherein the communication passageway penetrates along a first direction, wherein the valve is inserted into the communication passageway from one side in the first direction and attached to the communication passageway, wherein the switching inhibition mechanism is configured as a stopper that regulates movement of the valve to said one side in the first direction.

At least one embodiment of the present invention is the work machine, wherein a cap is attached to one side portion in the first direction of the communication passageway to block the communication passageway, wherein the valve is attached to other side portion in the first direction of the communication passageway, wherein the stopper is disposed between the cap and the valve.

At least one embodiment of the present invention is the work machine, wherein the cap is provided with a fitted portion, wherein the stopper is provided with a fitting portion configured to be able to fit the fitted portion, wherein the stopper is fixed to the cap by fitting the fitting portion to the fitted portion.

At least one embodiment of the present invention is the work machine, wherein the valve comprises: a valve core attached in the communication passageway and having an opening made to communicate with the inside of the pressure chamber; and a valve plug movably provided on the valve core, and disposed on a closed position to close the opening and to open the opening by moving from the closed position when the valve is activated, wherein the stopper has a valve plug holding portion that fits with the valve plug in the closed position to hold the valve plug in the closed position.

At least one embodiment of the present invention is the work machine, wherein the stopper is constituted of an elastic material having elasticity and presses the valve core toward the other side in the first direction.

At least one embodiment of the present invention is the work machine, wherein the switching inhibition mechanism comprises: an attachment member to which the valve is attached and disposed between the communication passageway and the valve; and a vibration absorbing member provided between the communication passageway and the attachment member to absorb vibration received by the valve.

At least one embodiment of the present invention is the work machine, wherein the communication passageway penetrates along the first direction, wherein the vibration absorbing member comprises: a first vibration absorbing member that absorbs the vibration in a direction perpendicular to the first direction; and a second vibration absorbing member that absorbs the vibration in the first direction.

Advantage of the Present Invention

According to one or more embodiments of the present invention, workability can be improved.

DETAILED DESCRIPTION OF THE INVENTION

First Embodiment

Hereinafter, a driving machine 10 as a working machine according to a first embodiment will be explained using FIG. 1 to FIG. 11. Arrows UP, FR, and RH shown in drawings as appropriate indicate upper, front, and right sides of the driving machine 10, respectively. In the following description, when directions up-down, front-back, and left-right are used, they shall indicate vertical, front and back, and left and right directions of the driving machine 10, unless otherwise noted. Up-down direction corresponds to a first direction of the present invention, and upper side corresponds to one side of the first direction of the present invention.

Figure 1:
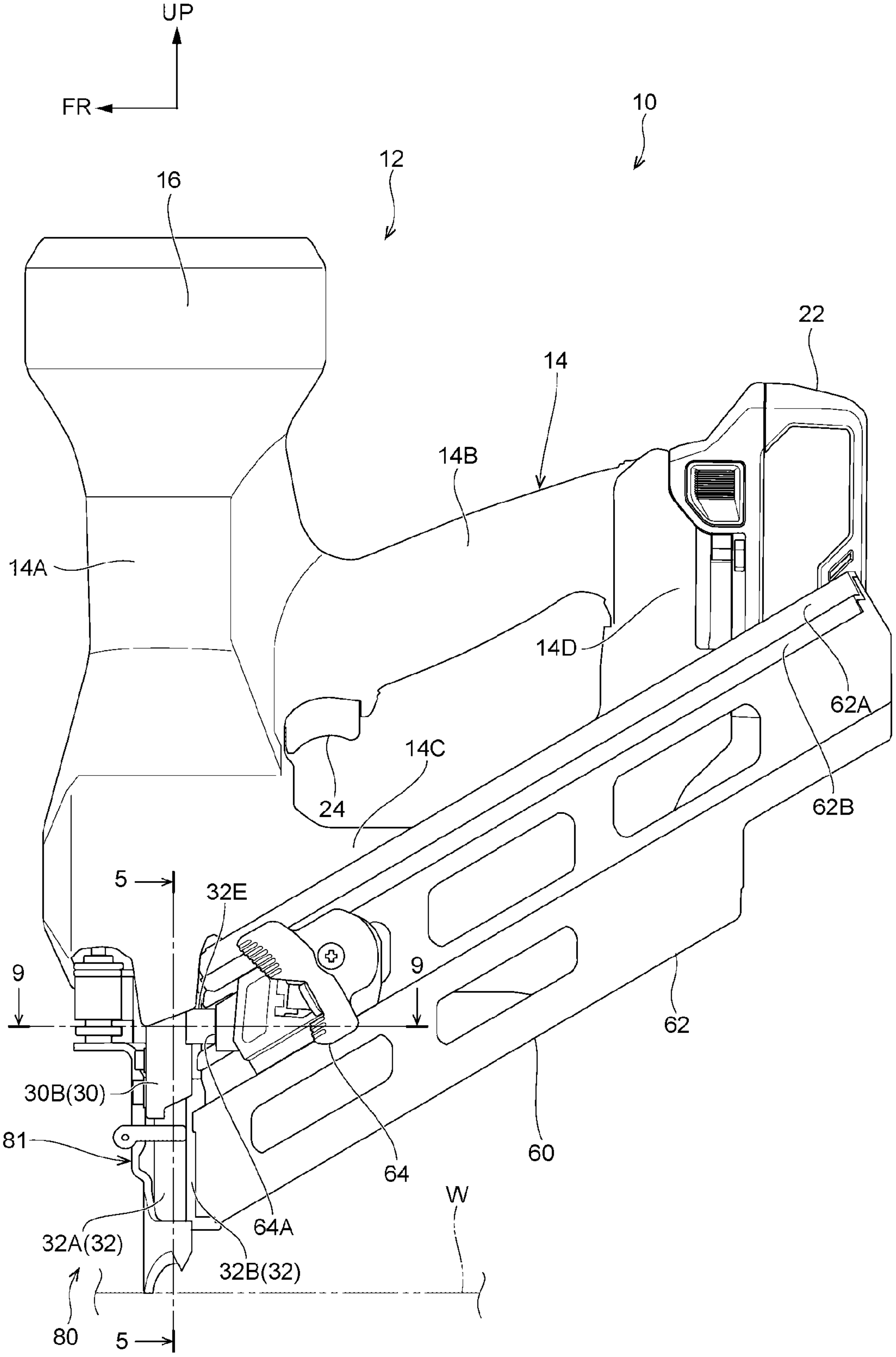
FIG. 1 is a side view from left side showing a driving machine according to a first embodiment.
Figure 2:
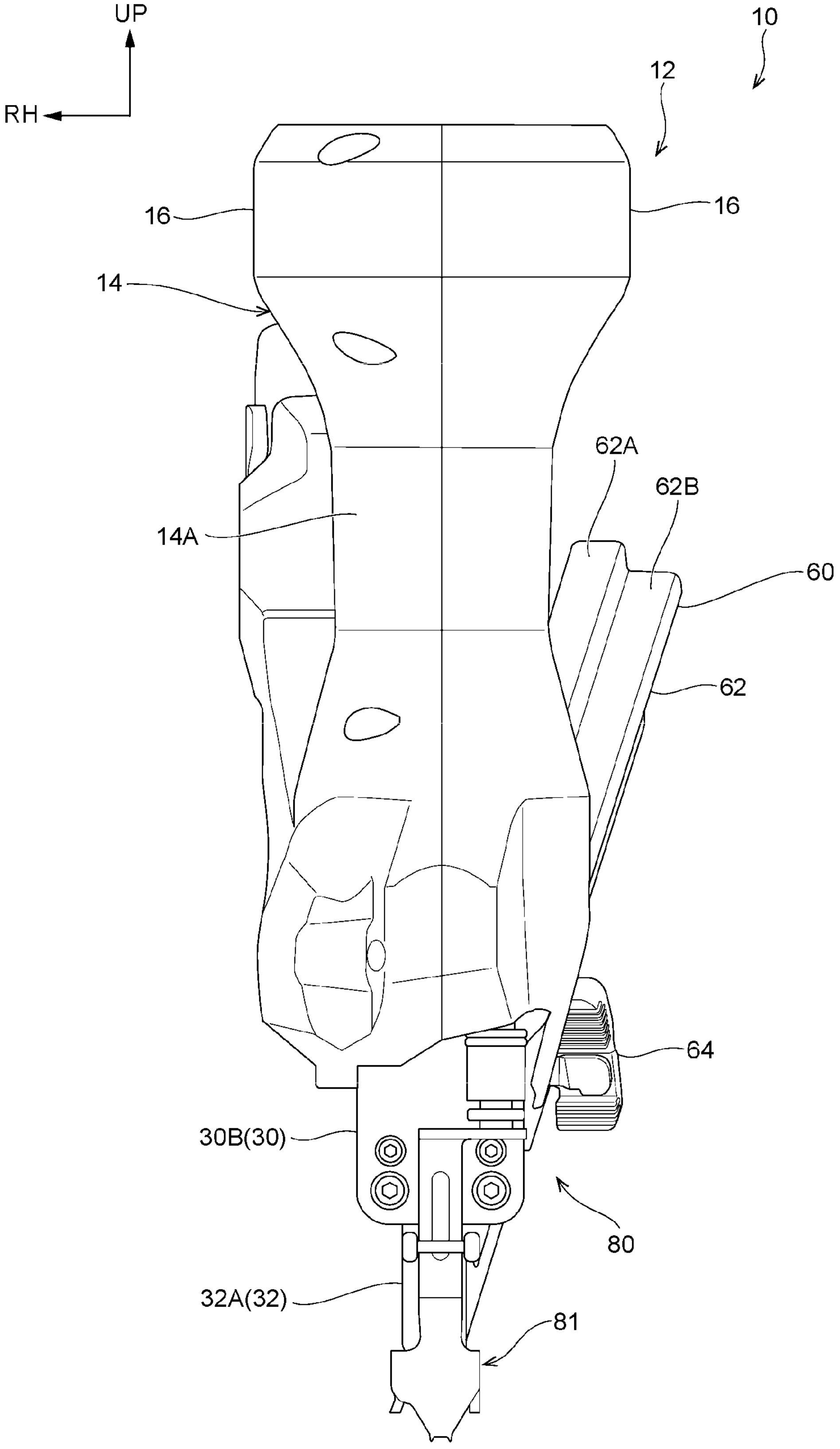
FIG. 2 is a front view from front side showing the driving machine shown in FIG. 1.
Figure 3:
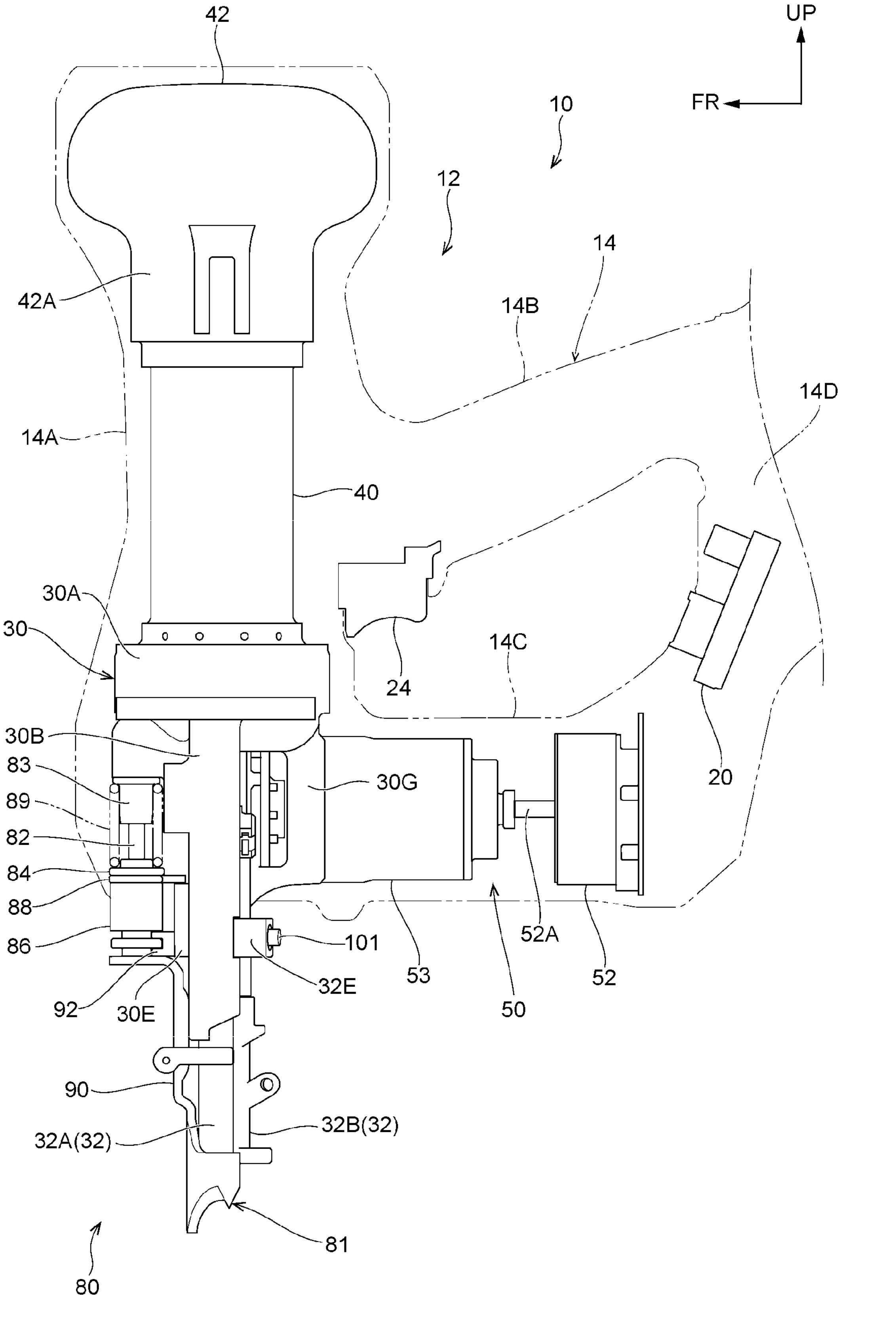
FIG. 3 is a side view from the left side showing inside of a housing of the driving machine shown in FIG. 1.

As shown in FIG. 1 to FIG. 3, the driving machine 10 has a driving machine main body 12, and a magazine 60 is attached to the driving machine main body 12. The driving machine 10 is configured as an electric tool for driving a nail N as a fastener loaded in the magazine 60 into a driving target material W. The driving machine main body 12 comprises a housing 14, a nose 30, a cylinder 40, a pressure storage container 42, and a drive mechanism 50. The driving machine main body 12 also has a driving depth adjustment mechanism 80, an empty driving prevention mechanism 100, and a valve mechanism 110. Each configuration of the driving machine 10 will be explained below.

Housing 14

The housing 14 is formed in a hollow, substantially inverted-P shape in a side view from left side. Specifically, the housing 14 has a main housing portion 14A extending in up-down direction, a handle portion 14B extending from a middle portion of the main housing portion 14A in the up-down direction to rear diagonally upward, and a motor housing portion 14C extending from a lower end portion of the main housing portion 14A to rear side. A rear end of the motor housing portion 14C is bent upward and connected to the rear end of the handle portion 14B.

A controller 20 is provided within the rear end of the motor housing portion 14C. The controller 20 that controls a motor 52 described further below and controls drive of a striker 44 described further below. The rear end of the handle portion 14B is configured as a battery mounting portion 14D, and a battery 22 is removably mounted in the battery mounting portion 14D. The battery 22 is electrically connected to the controller 20 and supplies power from the battery 22 to the controller 20.

A trigger 24 is provided within a front end of the handle portion 14B. The trigger 24 protrudes downward from the handle portion 14B and is configured for upward pulling operation. A trigger switch (not shown) is provided within the front end of the handle portion 14B. When the trigger 24 is pulled, the trigger switch is pressed and a detection signal is output from the trigger switch to the controller 20.

Nose 30

As shown in FIG. 1 to FIG. 6, the nose 30 is made of metal and is disposed within a lower end of the body housing portion 14A. The nose 30 has a nose attachment cylinder portion 30A comprising an upper end of the nose 30 and an ejector main body 30B extending downward from the nose attachment cylinder portion 30A. The nose attachment cylinder portion 30A is formed in a substantially bottomed cylindrical shape open to the above. An ejection hole 30C is formed through center of a bottom wall of the nose attachment cylinder portion 30A. A substantially cylindrical bumper 36 (cf. FIG. 4 and FIG. 5) is housed inside the nose attachment cylinder portion 30A. When the striker 44 described further below descends from an upper dead point to a lower dead point, the striker 44 impacts the bumper 36, and the kinetic energy of the striker 44 is absorbed by the bumper 36.

The ejector main body 30B extends downward from the nose attachment cylinder portion 30A. The ejector main body 30B is provided with a blade guide 32. The blade guide 32 is formed in a substantially rectangular cylindrical shape extending in the up-down direction and is disposed below the ejection hole 30C. The blade guide 32 comprises a front guide member 32A comprising a front portion of the blade guide 32 and a rear guide member 32B comprising a rear portion of the blade guide 32. The front guide member 32A and the rear guide member 32B are fastened and fixed to the ejector main body 30B.

Figure 9:
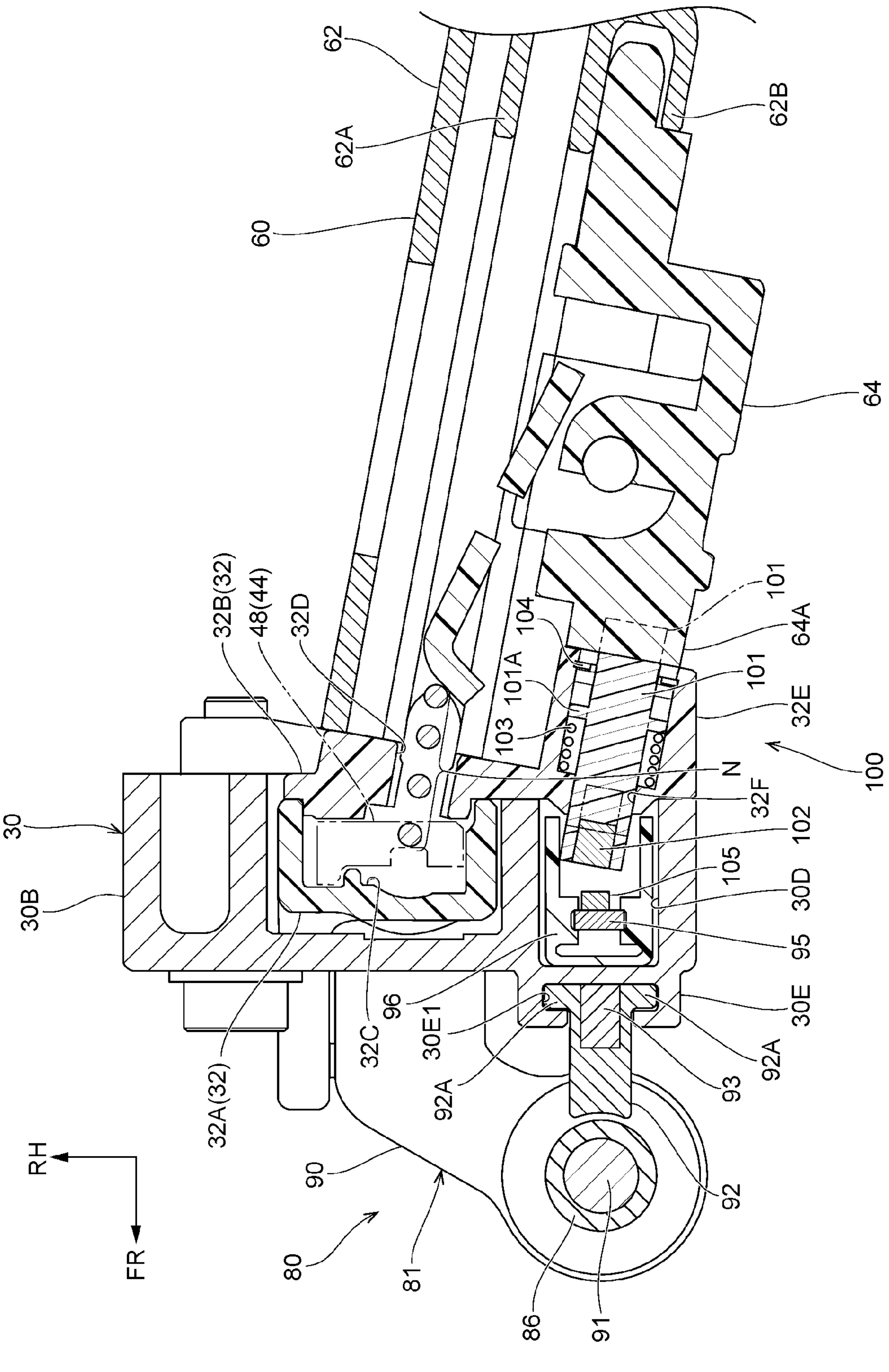
FIG. 9 is a cross-sectional view from the above showing the area around the lower end of the driving machine shown in FIG. 1 (line 9-9 cross section in FIG. 1).

As shown in FIG. 9, the inside of the blade guide 32 is configured as an ejection path 32C. The ejection path 32C is disposed below the aforementioned ejection hole 30C. A guide slit 32D is formed in the rear guide member 32B, and the ejection path 32C is opened to the rear side by the guide slit 32D. On the left side of the guide slit 32D, the rear guide member 32B is provided with a lever housing portion 32E for housing a feeder detection lever 101 described further below. The lever housing portion 32E is formed as a substantially bottomed rectangular cylinder open to the rear side. A circular-shaped insertion hole 32F is formed through a front wall of the lever housing portion 32E.

Figure 5:
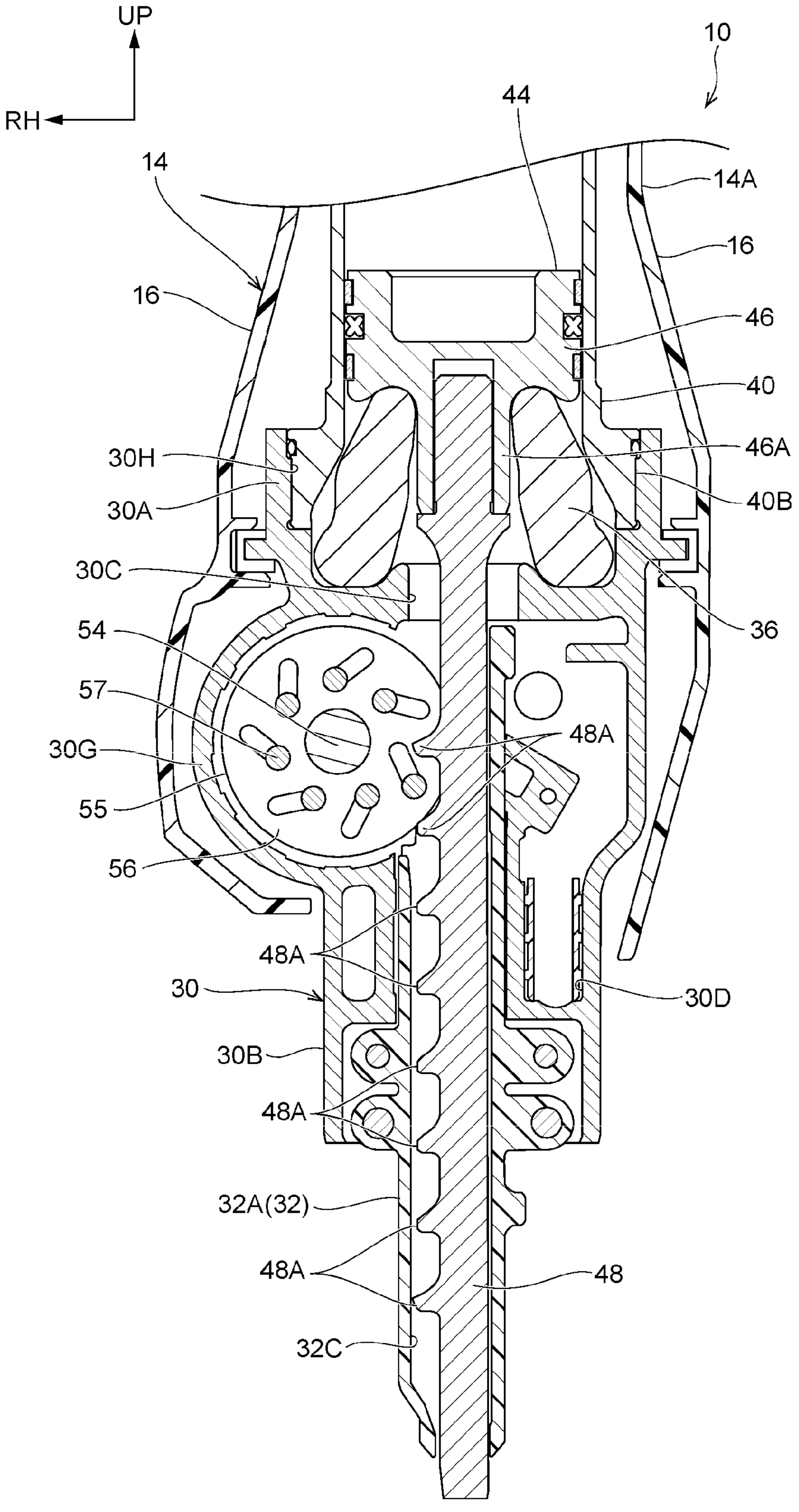
FIG. 5 is a cross-sectional view from the front side showing area around a lower end of the driving machine shown in FIG. 1 (line 5-5 cross-section in FIG. 1).
Figure 6:
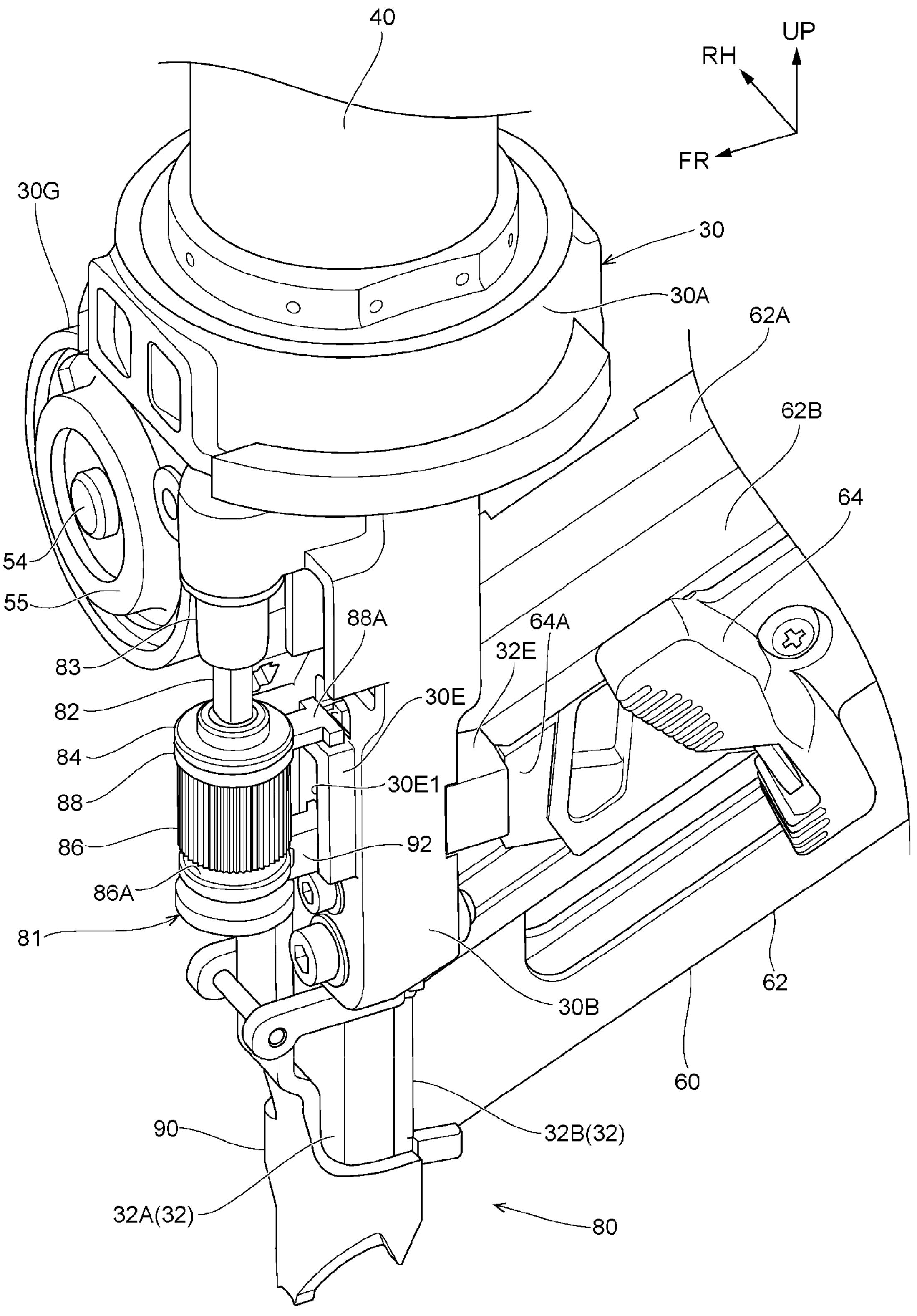
FIG. 6 is a diagram of the area around the lower end of the driving machine shown in FIG. 3.

In the ejector main body 30B, a substrate housing portion 30D to house a sensor substrate 95 described further below is formed on front side of the lever housing portion 32E. The substrate housing portion 30D is formed in a concave shape open to the rear side, and the substrate housing portion 30D and the lever housing portion 32E are made to communicate by the insertion hole 32F. A guide rail 30E protruding toward the front side, at the front side of the substrate housing portion 30D, is formed on a front surface of the ejector main body 30B. The guide rail 30E is formed in a rectangular block shape extending in the up-down direction (cf. FIG. 6). A guide groove 30E1 is formed in the guide rail 30E. The guide groove 30E1 extends in the up-down direction and is open to the front side, and is formed as a substantially T-shaped groove viewed from bottom. A sensor hole 30F is formed through the ejector main body 30B, which connects the substrate housing portion 30D and the guide groove 30E1 (cf. FIGS. 7 and 8). As shown in FIG. 5 and FIG. 6, a converter housing portion 30G, which houses a converter described further below, is formed at a right portion of the upper end of the ejector main body 30B. The converter housing portion 30G is cylindrical in shape with front-back direction as axis direction.

Cylinder 40

Figure 4:
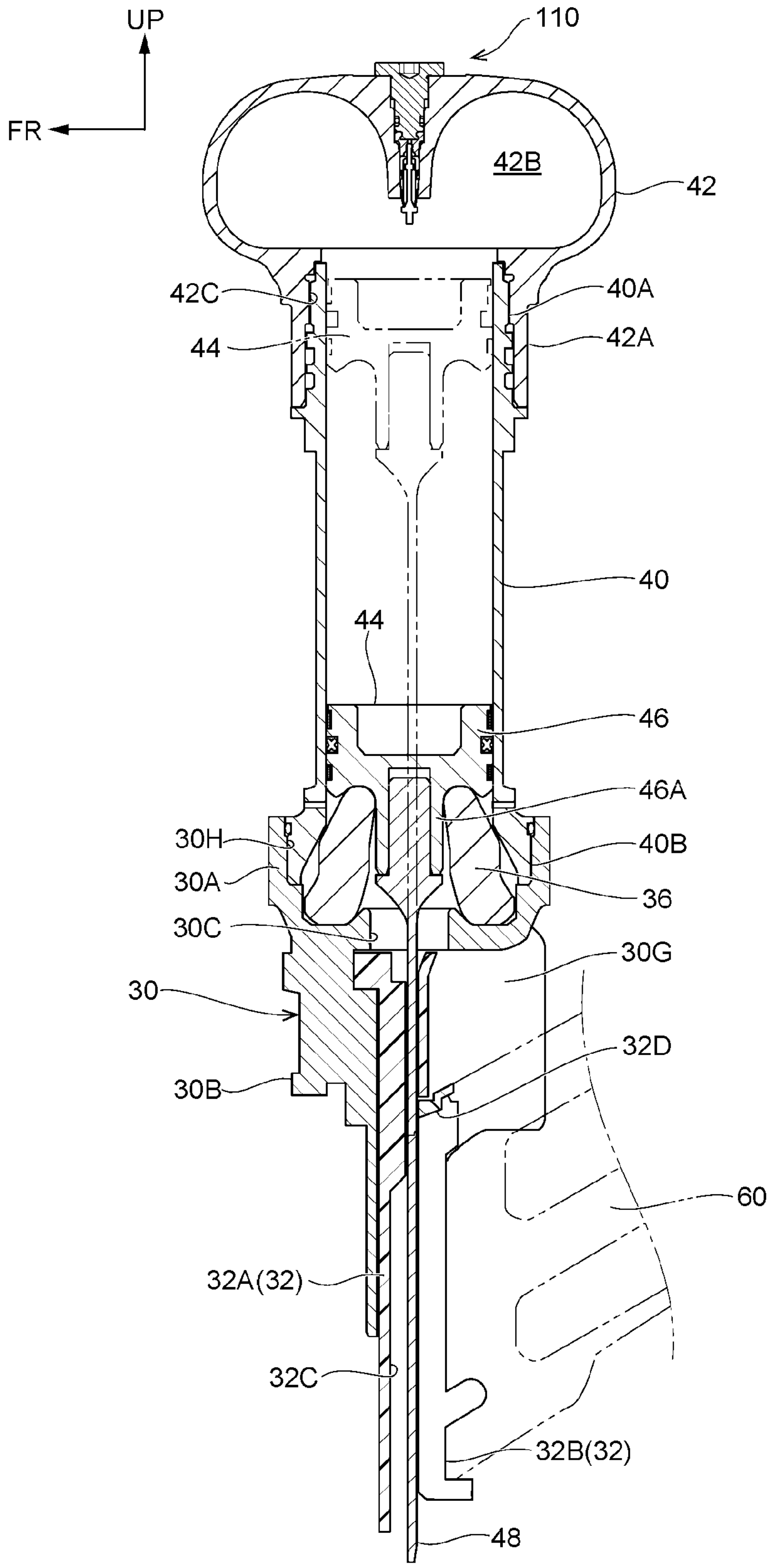
FIG. 4 is a cross-sectional view from the left side of a nose, a cylinder, and a pressure storage container shown in FIG. 3 in a combined state.

As shown in FIG. 3 through FIG. 5, the cylinder 40 is formed in a substantially cylindrical shape with the up-down direction as the axial direction, and is disposed above the nose 30 and within the body housing portion 14A. A male screw 40A is formed on an outer circumference of the upper end of the cylinder 40, and a male screw 40B is formed on the outer circumference of the lower end of the cylinder 40. The male screw 40B at the lower end of the cylinder 40 is screwed onto a female screw 30H formed on an inner circumference of the nose attachment cylinder portion 30A, and the cylinder 40 is fastened and fixed to the nose attachment cylinder portion 30A.

Pressure Storage Container 42

As shown in FIG. 3 and FIG. 4, the pressure storage container 42 is formed as a bottomed cylindrical shape open to lower side. A lower portion of the pressure storage container 42 is configured as a container attachment cylinder 42A. The container attachment cylinder 42A is formed in a cylindrical shape with the up-down direction as the axial direction. A female screw 42C is formed on an inner circumferential surface of the container attachment cylinder 42A, and the female screw 42C is screwed onto the male screw 40A of the cylinder 40 and the pressure storage container 42 is fastened and fixed to the cylinder 40.

An upper portion of the pressure storage container 42 is formed with a larger diameter than the container attachment cylinder 42A, and the outer circumference of the upper portion of the pressure storage container 42 is curved in an arc shape that is convex in the radially outward of the pressure storage container 42 in a longitudinal cross-section view. The inside of the pressure storage container 42 is configured as a pressure chamber 42B, and the pressure chamber 42B is made to communicate to the inside of the cylinder 40. The pressure chamber 42B is filled with gas. The gas filled in the pressure chamber 42B is air, inert gas, etc. and in this embodiment, air is filled in the pressure chamber 42B. The valve mechanism 110 is provided in the center of a top wall of the pressure storage container 42, and an operator can use the valve mechanism 110 to replenish air in the pressure chamber 42B. The valve mechanism 110 is described further below.

Striker 44

As shown in FIG. 4 and FIG. 5, the striker 44 is formed in a long shape extending in the up-down direction and is housed in the cylinder 40 movable in the up-down direction. Specifically, the striker 44 is configured to move between the upper dead point (position indicated by two-dot chain lines in FIG. 4) and the lower dead point (position indicated by solid lines in FIG. 4 and FIG. 5), which is moved downward from the upper dead point. The striker 44 comprises a piston 46 configuring the upper end of the striker 44 and a driver blade 48 extending downward from the piston 46.

The piston 46 is formed in the substantially cylindrical shape with the up-down direction as the axial direction, and an outer diameter of the piston 46 is set slightly smaller than an inner diameter of the cylinder 40. In the center of the piston 46, a blade attaching portion 46A is formed for attaching the driver blade 48 described below. The blade attaching portion 46A is formed in the substantially cylindrical shape with the up-down direction as the axial direction, and extends downward from the piston 46.

The driver blade 48 is formed in a substantially long shape extending in the up-down direction. The upper end of the driver blade 48 is fitted into the blade attaching portion 46A, and the driver blade 48 extends downward from the piston 46. The driver blade 48 is configured to be movable within the ejection path 32C of the nose 30, so that the striker 44 moves from the upper dead point to the lower dead point to strike the nail N in the ejection path 32C from the upper side by the driver blade 48.

Drive Mechanism 50

As shown in FIG. 3 and FIG. 5, the drive mechanism 50 has the motor 52, a reduction mechanism 53, and a converter 55. The motor 52 is configured as a brushless motor and is housed within the rear end of the motor housing portion 14C and is electrically connected to the controller 20. The motor 52 has a drive shaft 52A whose axial direction is the front-back direction, and the front end of the drive shaft 52A is connected to a reduction mechanism 53 disposed at the front side of the motor 52. The reduction mechanism 53 is connected to a rotary shaft 54 provided in the converter housing portion 30G of the nose 30, and a rotary force of the motor 52 is transmitted to the rotary shaft 54 via the reduction mechanism part 53.

The converter 55 is disposed in the converter housing portion 30G. The converter 55 is configured as a mechanism that transmits the rotary force of the rotary shaft 54 to the driver blade 48 to move the driver blade 48 upward. The converter 55 comprises a pinwheel 56 fixed to the rotary shaft 54, a plurality of pinion pins 57 provided on the pinwheel 56, and a plurality of rack portions 48A formed on the driver blade 48. The pinion pins 57 are disposed at predetermined intervals in circumferential direction of the rotary shaft 54, and the rack portions 48A are disposed at predetermined intervals in the up-down direction.

The pinion pins 57 are configured to be able to engage and disengage the rack portions 48A. When the pinwheel 56 rotates and the pinion pins 57 engage the rack portions 48A, the driver blade 48 is configured to move upward. When the pinion pins 57 are disengaged from the rack portions 48A, the striker 44 is configured to move downward by pressure in the pressure chamber 42B.

Magazine 60

As shown in FIG. 1, FIG. 2, FIG. 4, FIG. 6, and FIG. 9, the magazine 60 comprises a magazine case 62 and a feeder

64. The magazine case 62 is formed in a substantially long and flat shape with left-right direction as thickness direction, and is extended in a direction sloping upward toward the rear side (this direction is hereinafter referred to as inclined direction) when viewed from the left side. The magazine case 62 is positioned adjacent to the left side of the motor housing portion 14C. The front end of the magazine case 62 is attached to the ejector main body 30B of the nose 30, and the rear end of the magazine 60 is fixed to the motor housing portion 14C. The magazine case 62 is slightly slanted to rear diagonally to left when viewed from the above (cf. FIG. 9).

The magazine case 62 has a first guide rail 62A and a second guide rail 62B extending along the inclined direction. The inside of the first guide rail 62A is configured as a housing portion where the nail N is loaded and is made to communicate to the ejection path 32C via the guide slit 32D (cf. FIG. 9). A feeder 64 for supplying nail N to the ejection path 32C is attached on the second guide rail 62B in a relative movable manner. The feeder 64 is biased toward the front end by a force spring (not shown). As a result, the nail N is supplied by the feeder 64 into the ejection path 32C of the ejector main body 30B. A pressing portion 64A for pressing the feeder detection lever 101 described further below is formed on the front end of the feeder 64.

Driving Depth Adjustment Mechanism 80

Figure 7:
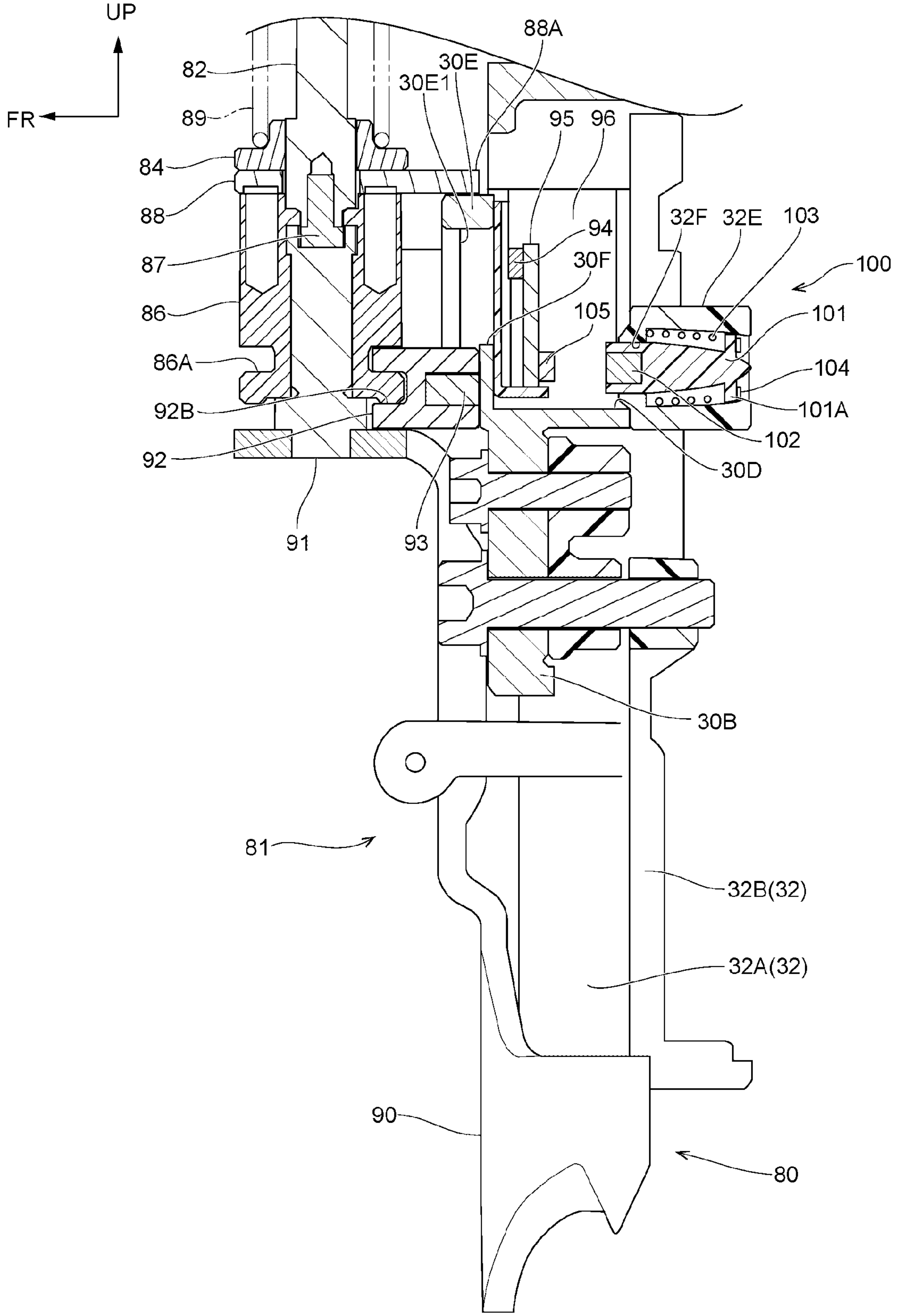
FIG. 7 is a cross-sectional view from right side showing a driving depth adjustment mechanism in the driving machine shown in FIG. 6.
Figure 8:
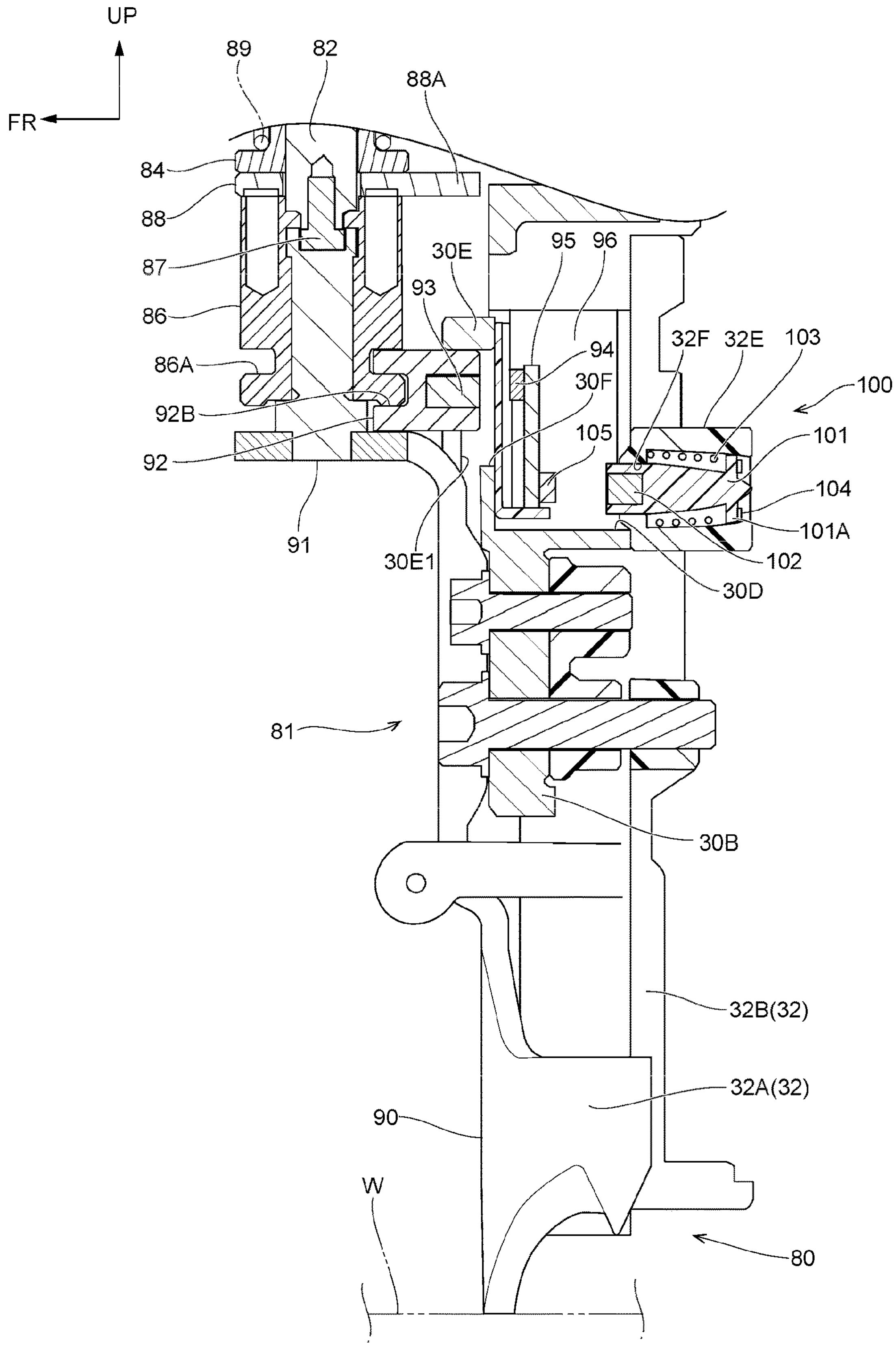
FIG. 8 is a cross-sectional view from the right side showing a push lever unit of the driving depth adjustment mechanism shown in FIG. 7 moved upward and disposed in a permitted position.

As shown in FIG. 6 to FIG. 8, the driving depth adjustment mechanism 80 comprises a push lever unit 81, a detection slider 92, and a lever position sensor 94.

The push lever unit 81 is extended in the up-down direction at the front side of the ejector main body 30B of the nose 30 and is connected to the ejector main body 30B in the relative movable manner in the up-down direction. Specifically, the push lever unit 81 is configured to be movable between a lever initial position (the position shown in FIG. 3 and FIG. 7) and a permitted position (the position shown in FIG. 8), which is moved upward from the lever initial position. The push lever unit 81 comprises a connecting shaft 82, an adjuster 86, and a push lever 90.

The connecting shaft 82 is formed in the shape of a substantially rectangular column extending in the up-down direction and is disposed in front of the upper end of the ejector main body 30B. An upper end portion of the connecting shaft 82 is inserted into the cylindrical support tube 83 fixed to the nose 30 in the relative movable manner in the up-down direction. A substantially circular plate-shaped spring receiving member 84 is fixed to the lower end portion of the connecting shaft 82, and the spring receiving member 84 is disposed radially outward from the connecting shaft 82.

The adjuster 86 is formed in the substantially cylindrical shape with the up-down direction as the axial direction, and is disposed below the spring receiving member 84. The lower end of the connecting shaft 82 is inserted into the upper end of the adjuster 86, and the adjuster 86 is rotatably supported by the connecting shaft 82. A connection pin 87 provided at the lower end of the connecting shaft 82 maintains the connection state of the adjuster 86 to the connecting shaft 82. A groove 86A is formed in the lower end portion of the outer circumference of the adjuster 86.

At the lower end of the connecting shaft 82, a stopper plate 88 is provided between the spring receiving member 84 and the adjuster 86. The stopper plate 88 has a contact piece 88A extending to the rear. Furthermore, a push spring 89 configured as a compressed coil spring is mounted to the connecting shaft 82, and the push spring 89 forces the push lever unit 81 downward. As a result, the contact piece 88A contacts an upper surface of the guide rail 30E of the ejector main body 30B at the nose 30, and the push lever unit 81 is held in an initial lever position.

The push lever 90 is formed in form of a substantially long plate, with the front-back direction as plate thickness direction and extending in the up-down direction. The upper end of the push lever 90 is bent and disposed below the adjuster 86. An adjustment shaft 91 provided at the upper end of the push lever 90 is screwed onto a screw portion formed on the inner circumferential surface of the adjuster 86, and the push lever 90 is screw-coupled to the adjuster 86. Thus, by rotating the adjuster 86 around the axis, the push lever 90 moves relative to the adjuster 86 in the up-down direction, and the push lever unit 81 is configured to extend and retract in the up-down direction.

In the initial lever position of the push lever unit 81, the lower end of the push lever 90 protrudes lower than the blade guide 32. By moving the push lever 90 upward against the force of the push spring 89, the push lever unit 81 is set to be disposed in the permitted position. Thereby, a driving depth of the nail N into the driving target material W is adjusted.

As also shown in FIG. 9, the detection slider 92 is made of resin and is formed in the shape of a substantially T-shaped block, viewed from the above. The rear end of the detection slider 92 has a pair of left and right flanges 92A protruding outward in the left-right direction. The rear end of the detection slider 92 is inserted from the lower side into the guide groove 30E1 of the guide rail 30E, and is connected to the ejector main body 30B in the relative movable manner in the up-down direction.

A connecting groove 92B is formed in the middle of the front surface of the detection slider 92 in the up-down direction, and the connecting groove 92B penetrates in the left-right direction. The lower end of the adjuster 86 is inserted into the connecting groove 92B, and the adjuster 86 and the detection slider 92 are engaged in the up-down direction. As a result, the detection slider 92 and the adjuster 86 are connected to be movable in one piece in the up-down direction, and the adjuster 86 can rotate relative to the detection slider 92. A magnet 93 is embedded in the rear of the detection slider 92. The magnet 93 is formed in the substantially cylindrical shape with the front-back direction as the axial direction.

The lever position sensor 94 is provided on the sensor substrate 95 housed in the substrate housing portion 30D. The sensor substrate 95 is attached to the ejector main body 30B via a substrate holder 96 made of resin. The lever position sensor 94 is provided at the top of the front surface of the sensor substrate 95 and at the rear side of the sensor hole 30F. The lever position sensor 94 is a magnetic sensor configured as a Hall element and is electrically connected to the controller 20. In the permitted position of the push lever unit 81, the magnet 93 is configured to be disposed opposite to the lever position sensor 94 in the front-back direction via the sensor hole 30F. As a result, the lever position sensor 94 outputs the detection signal corresponding to magnetic flux density of the magnet 93 to the controller 20, and the controller 20 detects the permitted position of the push lever unit 81 based on the detection signal of the lever position sensor 94.

Empty Driving Prevention Mechanism 100

As shown in FIG. 7 to FIG. 9, the empty driving prevention mechanism 100 comprises the feeder detection lever 101 and a feeder position sensor 105. The feeder detection lever 101 is formed in the substantially cylindrical shape and is housed in the lever housing portion 32E of the ejector main body 30B in the relative movable manner. The frontend portion of the feeder detection lever 101 is inserted through the insertion hole 32F of the lever housing portion 32E. The rear end of the feeder detection lever 101 has a flange 101A protruding radially outward. A return spring 103 configured as a compression coil spring is mounted to the feeder detection lever 101, and the return spring 103 forces the feeder detection lever 101 toward the rear. The flange 101A contacts a retaining ring 104 provided in the lever housing 32E, and the feeder detection lever 101 is held in a released position (indicated by the two-dot chain lines in FIG. 9).

A magnet 102 is embedded in the front end of the feeder detection lever 101, and the front surface of the magnet 102 is disposed flush with the front surface of the feeder detection lever 101. When remaining quantity of nails N becomes less than a predetermined number, the pressing portion 64A of the feeder 64 of the magazine 60 presses the rear end of the feeder detection lever 101 toward the front side, and the feeder detection lever 101 is disposed in an approaching position (the position indicated by the solid lines in FIG. 9), which is closer to the feeder position sensor 105 described below.

The feeder position sensor 105 is provided on lower rear side of the sensor substrate 95 and in front side of the feeder detection lever 101. Similar to the lever position sensor 94, the feeder position sensor 105 is a magnetic sensor configured as a Hall element, and is electrically connected to the controller 20. As a result, the controller 20 is configured to detect the movement of the feeder detection lever 101 to the approaching position based on the detection signal of the feeder position sensor 105, and also to detect that the remaining quantity of nails N is less than the predetermined number.

Valve Mechanism 110

Figure 10:
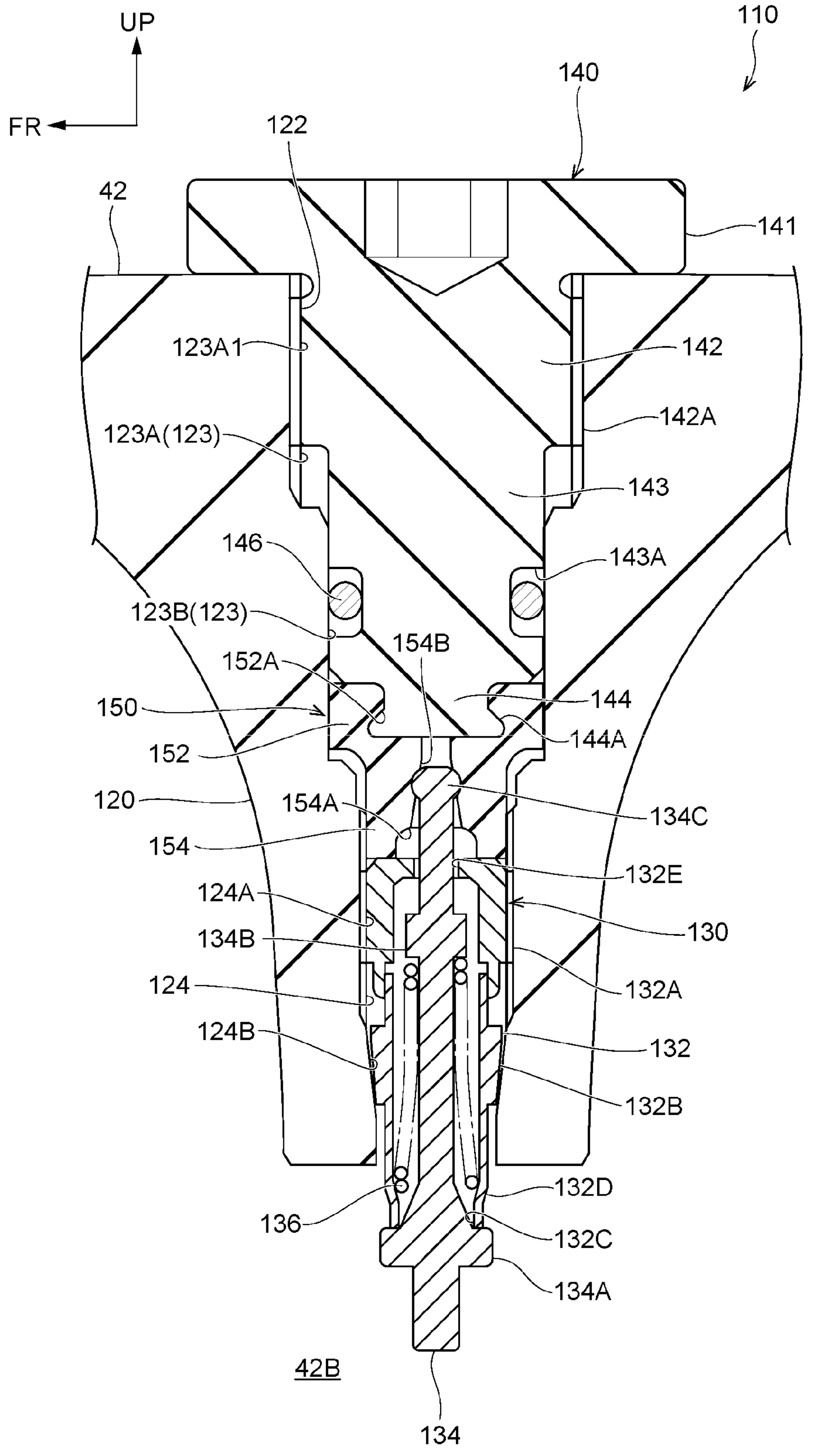
FIG. 10 is an enlarged cross-sectional view showing a valve mechanism in the pressure storage container shown in FIG. 4.

As shown in FIG. 4, the valve mechanism 110 is provided on the top wall of the pressure storage container 42. As shown in FIG. 10, the valve mechanism 110 comprises an attaching base 120, a valve 130, a valve cap 140 as a cap, and a valve stopper 150 as a switching inhibition mechanism and a stopper.

Attaching Base 120

The attaching base 120 is provided at the center of the top wall of the pressure storage container 42. The attaching base 120 is substantially cylindrical in shape with the up-down direction as the axial direction, and extends downward (toward the pressure chamber 42B) from the top wall of the pressure storage container 42. The outer diameter of the attaching base 120 is set to increase toward the upper side, and the outer circumference of the attaching base 120 is curved radially outward toward the upper side in the longitudinal cross-section view. The inside of the attaching base 120 is configured as a communication passageway 122. The communication passageway 122 penetrates in the up-down direction, and the inside of the pressure storage container 42 (pressure chamber 42B) and the outside are made to communicate by the communication passageway 122.

The upper portion of the communication passageway 122 is configured as a cap attaching portion 123 for attaching the valve cap 140 described further below, and the lower portion of the communication passageway 122 is configured as a valve attaching portion 124 for attaching the valve 130 described further below. The cap attaching portion 123 is formed in the form of a stepped hole. Specifically, the upper portion of the cap attaching portion 123 is configured as an upper cap attaching portion 123A and the lower portion of the cap attaching portion 123 is configured as a lower cap attaching portion 123B. The Inner diameter of the upper cap attaching portion 123A is greater than that of the lower cap attaching portion 123B. A female screw 123A1 is formed on the inner circumferential surface of the upper cap attaching portion 123A.

The inner diameter of the valve attaching portion 124 is set smaller than the inner diameter of the lower cap attaching portion 123B. A female screw 124A is formed on the inner circumference of the upper portion of the valve attaching portion 124. A taper portion 124B is formed in the lower portion of the valve attaching portion 124, and the inner diameter of the tapered portion 124B is set to decrease toward the lower portion. As a result, the tapered portion 124B slopes in a straight line in radially inward of the communication passageway 122 toward the lower portion in the longitudinal cross-section view.

Valve 130

The valve 130 comprises a valve core 132, a plunger 134 as a valve plug, and a valve spring 136 as a force member.

The valve core 132 configures an outline of the valve 130. The valve core 132 is formed as the substantially bottomed cylindrical shape that is open to the lower side as a whole. The valve core 132 is constituted of core members that are divided into two parts, upper and lower, and the core members are assembled together to form the valve core 132. A male screw 132A is formed on the outer circumference at the upper end of the valve core 132. The valve core 132 is inserted into the communication passageway 122 from the upper side, and the male screw 132A is screwed onto the female screw 124A of the valve attaching portion 124 to attach the valve core 132 (valve 130) to the valve attaching portion 124. A tapered portion 132B corresponding to the tapered portion 124B of the valve attaching portion 124 is formed on the outer circumference of the valve core 132 in the middle portion in the up-down direction. The outer diameter of the tapered portion 132B is set to become smaller toward the lower side. The tapered portion 132B contacts the tapered portion 124B of the valve attaching portion 124 to regulate a downward movement of the valve 130.

With an attached state of the valve core 132 to the valve attaching portion 124, the lower end portion of the valve core 132 protrudes downward from the attaching base 120, and an opening 132C at the lower side of the valve core 132 is disposed inside the pressure chamber 42B. In the lower end portion of the valve core 132, a core side locking portion 132D is formed below the tapered portion 132B to lock the valve spring 136 described further below. The core side locking portion 132D comprises a sloping wall that slopes radially inward toward the bottom. A circular-shaped insertion hole 132E is formed through the top wall of the valve core 132 in the center.

The plunger 134 is configured as an open-close member for opening and closing the opening 132C of the valve core 132. The plunger 134 is formed in the substantially cylindrical shape with the up-down direction as the axial direction and is movably housed in the valve core 132 in the up-down direction. Specifically, the plunger 134 is held in a closed position shown in FIG. 10 by the valve spring 136 described further below, and is configured to move downward from the closed position. The upper end portion of the plunger 134 is inserted through the valve core 132 and the upper end of the plunger 134 protrudes upwardly from the valve core 132.

An open-close valve portion 134A is formed on the outer circumference of the lower end portion of the plunger 134. The open-close valve portion 134A is formed in a substantially ring shape and protrudes radially outward from the plunger 134. In the closed position of the plunger 134, the opening 132C of the valve core 132 is closed by the open-close valve portion 134A, and when the plunger 134 is lowered from the closed position, the opening 132C of the valve core 132 is switched to an open state (communication state). The upper end portion of the plunger 134 has a plunger side locking portion 134B for locking the valve spring 136 described below. The plunger side locking portion 134B protrudes radially outward of the plunger 134 and is disposed in the valve core 132. A plunger head 134C (which is an element broadly understood as an engaging portion) that expands radially outward is formed at the upper end of the plunger 134. The outer circumference of the plunger head 134C is formed in a substantially semicircular shape that is convex in the radially outward in the longitudinal cross-section view.

The valve spring 136 is configured as the compression coil spring and is mounted to the middle portion of the plunger 134 in the up-down direction. The upper end of the valve spring 136 is locked with the plunger side locking portion 134B, and the lower end of the valve spring 136 is locked with the core side locking portion 132D of the valve core 132, causing the valve spring 136 to force the plunger 134 upward. Therefore, in an inactive state of the valve 130, the plunger 134 is held in the closed position by the valve spring 136, and the opening 132C of the valve core 132 is closed. As a result, the valve 130 shuts off the inside of the pressure storage container 42 (pressure chamber 42B) from the outside, maintaining an airtight state of the pressure chamber 42B. When replenishing air to the pressure chamber 42B, for example, an attachment such as an air compressor (not shown) is inserted into the communication passageway 122 to activate the valve 130 to replenish air. Specifically, by lowering the plunger 134 from the closed position against the force of the valve spring 136, the opening 132C of the valve core 132 is opened, and in this state, air is replenished.

Valve Cap 140

The valve cap 140 is formed in a substantially stepped cylindrical shape with the up-down direction as the axial direction. Specifically, the valve cap 140 comprises a disc-shaped cap head 141 comprising the upper end of the valve cap 140, an upper shaft portion 142 extending downward from the cap head 141, and a lower shaft portion 143 extending downward from the upper shaft portion 142. The diameter of the upper shaft portion 142 is set smaller than the diameter of the cap head 141, and the diameter of the lower shaft portion 143 is set smaller than the diameter of the upper shaft portion 142 and the inner diameter of the lower cap attaching portion 123B in the communication passageway 122. A male screw 142A is formed on the outer circumference of the upper shaft portion 142.

The valve cap 140 is attached to the cap attaching portion 123 of the communication passageway 122 from the upper side. Specifically, the male screw 142A of the upper shaft portion 142 of the valve cap 140 is screwed onto the female screw 123A1 of the upper cap attaching portion 123A, and the lower shaft portion 143 is disposed in the lower cap attaching portion 123B. When the valve cap 140 is attached on the pressure storage container 42, the lower end of the valve cap 140 is disposed spaced apart on the upper side of the plunger 134 of the valve 130.

A seal groove 143A is formed on the outer circumference in the up-down direction in the middle portion of the lower shaft portion 143. The seal groove 143A extends in the circumferential direction of the lower shaft portion 143 and is formed over the entire circumferential direction. An elastic ring-shaped seal member 146 is provided in the seal groove 143A, and the seal member 146 seals between the attaching base 120 and the valve cap 140.

The lower end of the valve cap 140 has a cap-fixed portion 144 as a fitted portion. The cap-fixed portion 144 is formed in the substantially cylindrical shape with a smaller diameter than the lower shaft portion 143 and protrudes downward from the lower shaft portion 143. A cap groove 144A is formed at the top of the outer circumference of the cap-fixed portion 144. The cap groove 144A extends in the circumferential direction of the cap-fixed portion 144 and is formed over the entire circumferential direction.

Valve Stopper 150

The valve stopper 150 is constituted of an elastic material such as rubber. The valve stopper 150 is formed in the substantially stepped cylindrical shape with the up-down direction as the axial direction and is disposed between the valve 130 and the valve cap 140 in the communication passageway 122.

The upper end of the valve stopper 150 is configured as a stopper fixing portion 152 as a fitting portion, and the stopper fixing portion 152 is formed in a substantially bottom cylindrical shape open to the upper side. A stopper groove 152A corresponding to the cap groove 144A of the cap-fixed portion 144 in the valve cap 140 is formed in the lower portion of the inner circumference of the stopper fixing portion 152. The stopper groove 152A is extended along and formed over the entire circumferential direction of the stopper fixing portion 152. The cap-fixed portion 144 is fitted into the stopper fixing portion 152 from the upper side, and the cap groove 144A and the stopper groove 152A engage in the up-down direction, securing the valve stopper 150 to the valve cap 140. In the state where the valve stopper 150 is fixed to the valve cap 140, the upper surface of the stopper fixing portion 152 contacts a lower surface of the lower shaft portion 143 of the valve cap 140. Furthermore, the outer diameter of the stopper fixing portion 152 is set slightly smaller than the inner diameter of the lower cap attaching portion 123B of the communication passageway 122, and the stopper fixing portion 152 is disposed within the lower end of the lower cap attaching portion 123B.

The lower portion of the valve stopper 150 is configured as the stopper body portion 154 as the valve plug holding portion. The stopper body portion 154 is formed in the substantially cylindrical shape with the up-down direction as the axial direction and extends downward from the stopper fixing portion 152. The lower surface of the stopper body portion 154 contacts the upper surface of the valve core 132, and the stopper body portion 154 is compressed and deformed in the up-down direction. As a result, the valve stopper 150 is configured to function as a pressing member that presses the valve core 132 downward and as a regulating member that regulates an upward movement of the valve core 132. More specifically, the valve stopper 150 presses the valve core 132 to the lower side to regulate the relative rotation of the valve core 132 relative to the attaching base 120 and to inhibit loosening of the fixation of the valve 130.

In the center of the bottom surface of the valve stopper 150, a counterbored portion 154A is formed that is open to the bottom. The diameter of the counterbored portion 154A is greater than the diameter of the plunger head 134C. A retaining hole 154B penetrates the top surface of the counterbore 154A in up-down direction. The inner diameter of the retaining hole 154B slopes slightly radially outward toward the bottom. Specifically, the diameter of the lower end of the retaining hole 154B is approximately the same as the diameter of the plunger head 134C. The plunger head 134C is inserted into the retaining hole 154B from the lower side, and the retaining hole 154B is elastically deformed radially outward to hold the plunger 134 in the closed position by the stopper body portion 154. In other words, the valve stopper 150 also functions as a retaining member that holds the plunger 134 in the closed position.

When attaching the valve cap 140 to the cap attaching portion 123 of the pressure storage container 42, the valve cap 140 with the valve stopper 150 fixed is inserted into the communication passageway 122 from the upper side, and the plunger head 134C of the plunger 134 is inserted into the retaining hole 154B of the valve stopper 150 from the lower side. Therefore, the force of the valve spring 136 and the hardness of the valve stopper 150 are set so that the plunger 134 is not lowered from the closed position when the plunger head 134C is inserted into the retaining hole 154B.

Figure 11:
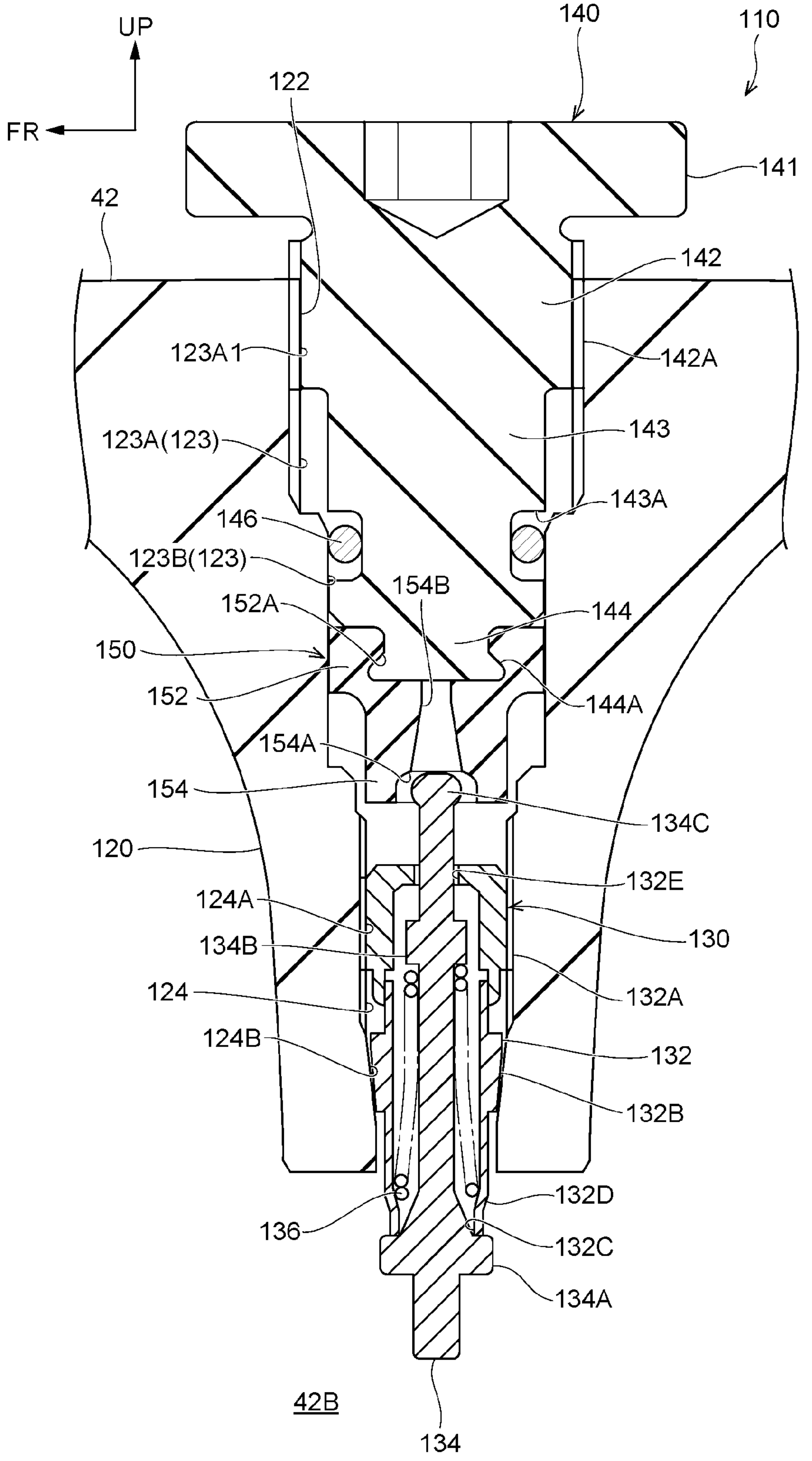
FIG. 11 is a cross-sectional view showing the valve mechanism shown in FIG. 10 to illustrate the removal of a valve cap and a valve stopper from the communication passageway.

When the valve cap 140 is removed from the communication passageway 122 in replenishing air to the pressure chamber 42B, the valve stopper 150 is configured to remain fixed to the valve cap 140 (cf. FIG. 11). In other words, the groove depths of the cap groove 144A and the stopper groove 152A and the hardness of the valve stopper 150 are adjusted so that the upper end of the plunger 134 can slip out of the retaining hole 154B of the valve stopper 150 while the fitted state between the cap-fixed portion 144 of the valve cap 140 and the stopper-fixing portion 152 of the valve stopper 150 is maintained.

Effect

Next, while describing the operation of the driving machine 10, the action and effect of the present embodiment will be described.

In the inactive state of the driving machine 10, the push lever unit 81 is disposed on the initial lever position, and the lower end of the push lever 90 protrudes below than the blade guide 32. In this state, the magnet 93 of the driving depth adjustment mechanism 80 is disposed lower than the lever position sensor 94, and the controller 20 detects the initial lever position of the push lever 90 based on the detection signal of the lever position sensor 94. The controller 20 also detects a non-operation of the trigger 24 based on an output signal of the trigger switch.

When the controller 20 detects the initial lever position of the push lever 90 or the non-operation of the trigger 24, it stops (prohibits) the drive to the motor 52. Therefore, in the inactive state of the driving machine 10, the drive of the motor 52 is stopped. In this state, the pinion pins 57 are engaged with the rack portions 48A and the striker 44 is disposed on a standby position between the lower dead point and upper dead point. In this standby position, the lower end of the striker 44 is disposed at a position corresponding to the middle portion of the nail N in the up-down direction, and the nail N is not supplied in the ejection path 32C.

When the controller 20 detects the permitted position of the push lever unit 81 and the operation to the trigger 24, it drives the motor 52. Specifically, when the driving machine is pushed downward (toward the driving target material W), the push lever unit 81 moves upward from the initial lever position against the force of the push spring 89. This causes the detection slider 92 to move upward with the push lever unit 81. When the push lever unit 81 reaches the permitted position, the magnet 93 and the lever position sensor 94 are disposed opposite each other in the front-back direction, and the controller 20 detects the permitted position of the push lever unit 81. The controller 20 also detects the operation of the trigger 24 based on the output signal from the trigger switch.

When the motor 52 is driven, the driving force of the motor 52 rotates the pinwheel 56, causing the striker 44 to rise to the upper dead point. At the upper dead point of the striker 44, the pinion pins 57 are disengaged from the rack portions 48A. In this state, the lower end of the driver blade 48 is disposed above then the nail N, and the nail N is supplied into the ejection path 32C. Then, the striker 44 is lowered to the lower dead point by the pressure in the pressure chamber 42B and strikes the nail N downward. As a result, the nail N is ejected downward from the ejection portion 34 and driven into the driving target material W.

The controller 20 continues to drive the motor 52 even after the nail N is driven into the driving target material W. Therefore, the pinion pins 57 engage the rack portions 48A again, and the striker 44 is raised from the lower dead point and disposed in the standby position. The controller 20 is connected to a position sensor (not shown) that detects a vertical position of the striker 44, and the controller 20 detects the standby position of the striker 44 based on the output signal from the position sensor. When the controller 20 detects that the striker 44 has reached the standby position, it stops the motor 52.

In the driving machine 10, the valve mechanism 110 is provided on the top wall of the pressure storage container 42, and the valve mechanism 110 has a valve 130 for replenishing air into the pressure chamber 42B. The valve 130 is inserted from the top into the communication passageway 122 formed in the pressure storage container 42, and is attached to the valve attaching portion 124 of the communication passageway 122. Specifically, the male screw 132A of the valve 130 is screwed onto the female screw 124A of the valve attaching portion 124 in the pressure storage container 42.

Here, the valve mechanism 110 has the valve stopper 150, which is disposed on the upper side of the valve 130 and presses the valve core 132 downward. In other words, the valve stopper 150 regulates the valve core 132 (valve 130) from moving to the upper side. Therefore, the valve 130 can be well maintained in its attached state and the workability of the driving machine 10 can be improved. This point is explained below.

In the driving machine 10, the inside of the pressure storage container 42 is configured as the pressure chamber 42B. When the driving machine 10 is operated, pressure in the pressure chamber 42B causes the striker 44 to descend from the upper dead point to the lower dead point and strike the nail N downward while impacting the bumper 36. Therefore, vibration is generated in the nose 30 as the striker 44 impacts the bumper 36. As a result, each time the striker 44 descends to the lower dead point, the vibration generated in the nose 30 is transmitted from the cylinder 40 and the pressure storage container 42 to the valve 130. Air pressure in the pressure chamber 42B also acts on the valve 130. In other words, an upward pushing force due to the air pressure is acting on the valve 130.

Therefore, if the valve stopper 150 were omitted in the valve mechanism 110, the vibration received by the valve 130 and the air pressure acting on the valve 130 could release (loosen) a screw-coupling between the valve 130 and the valve attaching portion 124, causing the valve 130 to displace upward. If the plunger 134 moves from the closed position to the lower side by contacting the valve cap 140 due to the upward displacement of the valve 130, the opening 132C of the valve core 132 may open, causing the air in the pressure chamber 42B to leak out of the pressure storage container 42 from the valve 130 (communication state). Therefore, in order to prevent air leakage in the pressure chamber 42B, maintenance work such as re-screwing the valve 130 must be performed regularly, which may reduce the workability of the driving machine 10.

In contrast, the valve mechanism 110 of the driving machine 10 of the first embodiment has the valve stopper 150, as described above, which presses the valve core 132 from the upper side and regulates the valve core 132 (valve 130) from moving to the upper side. This allows the valve 130 to maintain a good screw-coupling to the pressure storage container 42 even when the vibration caused by the operation of the driving machine 10 and the air pressure in the pressure chamber 42B act on the valve 130. In other words, the valve stopper 150 allows the valve 130 to maintain a good attached state, and maintain a good inactive state of the valve 130. In other words, it is possible to inhibit the valve 130 from being in a communication state due to loosening of the screw-coupling between the valve 130 and the valve attaching portion 124. This eliminates the need for regular maintenance work on the valve 130 in the driving machine 10. Thus, the workability of the driving machine 10 can be improved.

The valve cap 140 is attached to the cap attaching portion 123 of the communication passageway 122. The valve cap 140 is disposed on the upper side with respect to the valve 130, and the valve stopper 150 is disposed between the valve 130 and the valve cap 140. This allows the valve cap 140 to regulate the movement of the valve stopper 150 to the upper side while the valve stopper 150 regulates the movement of the valve 130 to the upper side. In other words, the valve cap 140 and valve stopper 150 can regulate the upward movement of valve 130. Therefore, the valve 130 can be maintained in an even better attached state.

The lower end of the valve cap 140 has the cap-fixed portion 144, and the cap-fixed portion 144 is fitted into the stopper fixing portion 152 of the valve stopper 150 to secure the valve stopper 150 to the valve cap 140. Specifically, the cap groove 144A of the cap-fixed portion 144 and the stopper groove 152A of the valve stopper 150 engage in the up-down direction, and the valve stopper 150 is fixed to the valve cap 140. This allows the valve stopper 150 to be removed from the pressure storage container 42 together with the valve cap 140 by removing the valve cap 140 from the pressure storage container 42 when replenishing air to the pressure chamber 42B. Therefore, the valve stopper 150 can be provided between the valve 130 and the valve cap 140 in the communication passageway 122 while inhibiting decline in workability when replenishing air to the pressure chamber 42B.

In the valve stopper 150, the retaining hole 154B is formed through in the up-down direction, and the plunger head 134C of the plunger 134 is inserted into the retaining hole 154B. In the state where the plunger 134 is inserted into the retaining hole 154B, the retaining hole 154B is elastically deformed radially outward by the plunger head 134C of the plunger 134, and the stopper body portion 154 of the valve stopper 150 holds the plunger 134 in the closed position. This allows the valve stopper 150 to inhibit the plunger 134 from being lowered from the closed position (communication state) against the force of the valve spring 136 when the vibration caused by the operation of the driving machine 10 is received by the valve 130. Thus, the inactive state of valve 130 can be effectively maintained.

The valve stopper 150 is constituted of the elastic material having elasticity. This allows the valve stopper 150 to press the valve core 132 from the upper side and compress and deform the valve stopper 150, thereby providing a pressing force on the valve core 132 from the upper side with a simple configuration.

In the first embodiment, the valve cap 140 and the valve stopper 150 are constituted of separate parts, but the valve cap 140 and the valve stopper 150 may be integrally molded and constituted of a single part. This allows a process of attaching the valve stopper 150 to the valve cap 140 to be omitted.

Second Embodiment

Figure 12:
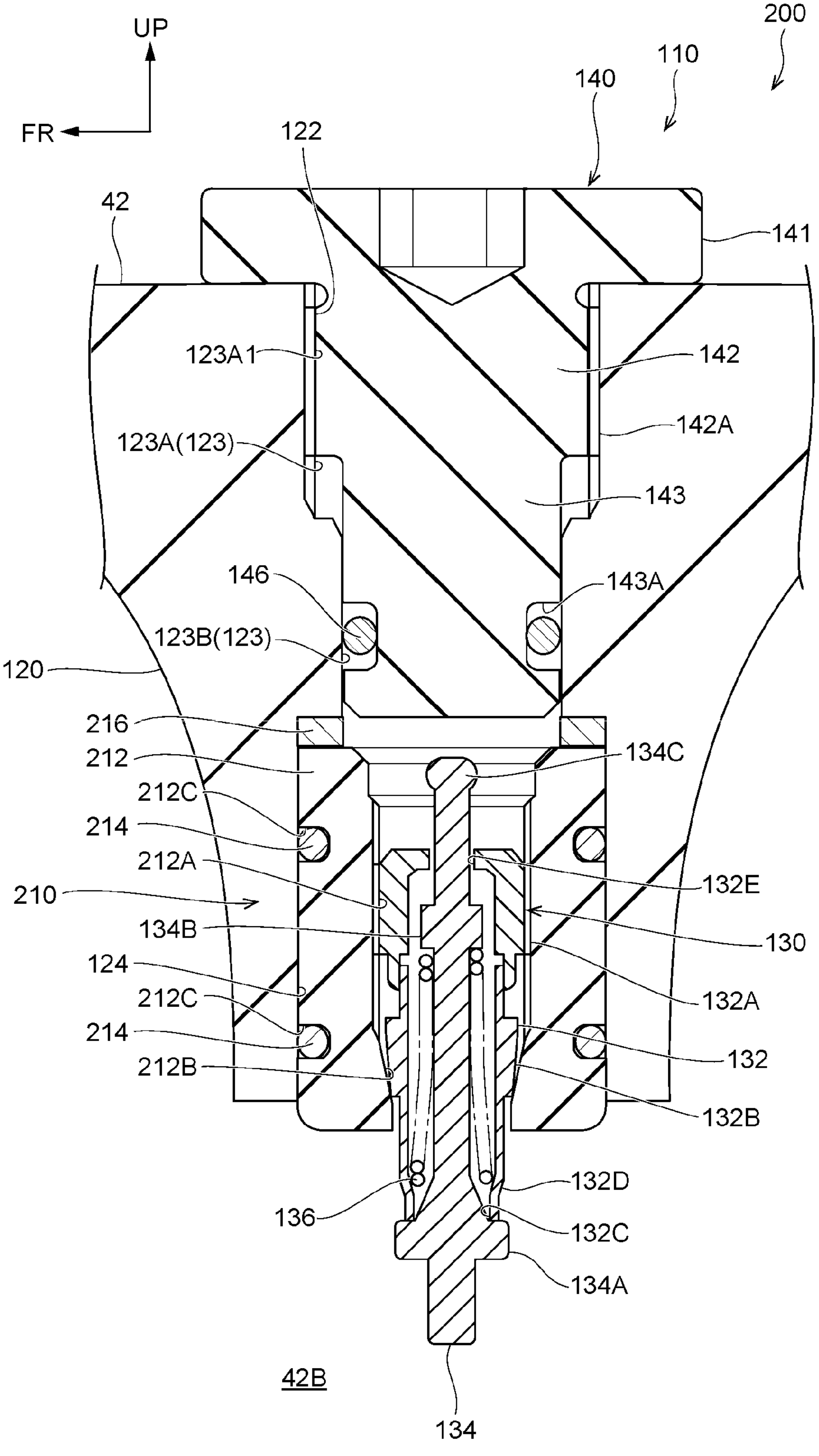
FIG. 12 is a cross-sectional view showing the valve mechanism according to a second embodiment of the driving machine.

A driving machine 200 as a working machine according to the second embodiment will be described below with reference to FIG. 12. The second embodiment of the driving machine 200 is configured in the same manner as the first embodiment of the driving machine 10, except for points shown below. In FIG. 12, parts similarly configured to those of the first embodiment of the driving machine 10 are marked with the same symbols.

As shown in FIG. 12, in the second embodiment, an inner diameter of a valve attaching portion 124 of a communication passageway 122 in a valve mechanism 110 is set larger than in the first embodiment. In the valve attaching portion 124, a female screw 124A and a tapered portion 124B of the first embodiment are omitted.

In the valve mechanism 110 of the second embodiment, a cap-fixed portion 144 is omitted in a valve cap 140. Furthermore, the valve mechanism 110 of the second embodiment has a switching inhibition mechanism 210 instead of a valve stopper 150 of the first embodiment. The switching inhibition mechanism 210 comprises a valve attachment member 212 as an attachment member attached to a valve 130, a first damper member 214 as a pair of upper and lower vibration absorbing members and a first vibration absorbing member, and a second damper member 216 as a vibration absorbing member and a second vibration absorbing member.

The valve attachment member 212 is formed in a substantially cylindrical shape with up-down direction as axial direction. An outer diameter of the valve attachment member 212 is set slightly smaller than an inner diameter of the valve attaching portion 124, and the valve attachment member 212 is disposed within the valve attaching portion 124. The valve attachment member 212 is disposed apart below than the upper surface of the valve attaching portion 124. A female screw 212A is formed at a top of an inner circumference of the valve attachment member 212. A tapered portion 212B is formed at a lower portion of the inner circumference of the valve attachment member 212. The tapered portion 212B is formed in the same manner as the tapered portion 124B of the valve attaching portion 124 of the first embodiment. That is, the tapered portion 212B is linearly inclined radially inward of the communication passageway 122 toward lower side in a longitudinal section view. A valve core 132 of the valve 130 is inserted into the valve attachment member 212 from upper side, and the male screw 132A of the valve 130 is screwed onto the female screw 212A to attach the valve core 132 (valve 130) to the valve attachment member 212. A tapered portion 132B of the valve 130 contacts the tapered portion 212B of valve attachment member 212 to regulate a movement of valve 130 to the lower side.

A pair of upper and lower grooves 212C are formed on an outer circumference of the valve attachment member 212. The grooves 212C extend along circumferential direction of the valve attachment member 212 and are formed over the entire circumferential direction of the valve attachment member 212.

The first damper member 214 is constituted of an elastic material and is formed in a shape of a ring with a circular cross section. The first damper member 214 is disposed within the groove portion 212C of the valve attachment member 212. Specifically, the first damper member 214 is compressed and deformed in radial direction of the valve attachment member 212 by an inner circumferential surface of the valve attaching portion 124 and bottom of the groove portion 212C, and the valve attachment member 212 is attached to the valve attaching portion 124. In other words, the valve attachment member 212 and the valve 130 are attached to the valve attaching portion 124 by the first damper member 214. As a result, the valve 130 is indirectly attached to the valve attaching portion 124 by the first damper member 214 and the valve attachment member 212, while the first damper member 214 absorbs a vibration in the radial direction of the valve 130 received by the valve 130 from the pressure storage container 42. Since the first damper member 214 is compressed and deformed, the first damper member 214 seals between the valve attachment member 212 and the valve attaching portion 124.

The second damper member 216 is constituted of the elastic material and is formed as a substantially circular plate with the up-down direction as plate thickness direction. The second damper member 216 is disposed between the upper surface of the valve attaching portion 124 and an upper end of the valve attachment member 212, and is compressed and deformed in the up-down direction by the valve attaching portion 124 and the valve attachment member 212. This configuration allows the second damper member 216 to absorb a vertical vibration received by the valve 130 from the pressure storage container 42. Since the second damper member 216 is compressed and deformed, the second damper member 216 seals space between the valve attachment member 212 and the valve attaching portion 124.

In the valve mechanism 110 of the driving machine 200 of the second embodiment, the valve 130 is attached to the valve attachment member 212 as described above, and the valve attachment member 212 is attached to the valve attaching portion 124 by the first damper member 214 and the second damper member 216. In other words, the valve 130 is indirectly attached to the valve attaching portion 124 via the switching inhibition mechanism 210. The first damper member 214 absorbs the vibration in the radial direction of the valve 130, which is received by the valve 130, and the second damper member 216 absorbs the vibration in the up-down direction. Therefore, the first damper member 214 and the second damper member 216 can inhibit the plunger 134 from being in a state of lowered from a closed position (communication state) against force of the valve spring 136, as a result of the vibration generated during operation of the driving machine 200 being received by the valve 130. Therefore, an inactive state of the valve 130 can be well maintained in the second embodiment. This eliminates need for regular maintenance work on the valve 130 in the driving machine 200. Therefore, in the second embodiment, workability of the driving machine 200 can also be improved.

The second embodiment may also be configured to attach the valve attachment member 212 to the valve attaching portion 124 by forming the female screw on the inner circumferential surface of the valve attaching portion 124 and also forming the male screw on the valve attachment member 212, and by screwing them together. Also in this configuration, the valve attachment member 212 can be attached in a relative movable state to the valve attaching portion 124 by the amount of gapping that occurs between the female screw of the valve attaching portion 124 and the male screw of the valve attachment member 212. Therefore, the vibration received by the valve 130 from the pressure storage container 42 can be absorbed by the first damper member 214 and the second damper member 216.

DESCRIPTION OF THE REFERENCE NUMERALS

10: Driving machine (work machine)
42: Pressure storage container
42B: Pressure chamber
44: Striker
130: Valve
132: Valve core
134: Plunger (valve plug)
140: Valve cap (cap)
144: Cap-fixed portion (fitted portion)
150: Valve stopper (switching inhibition mechanism, stopper)
152: Stopper fixing portion (fitting portion)
154: Stopper body portion (valve plug holding portion)
200: Driving machine (work machine)
210: Switching inhibition mechanism
212: Valve attachment member (attachment member)
214: First damper member (vibration absorbing member, first vibration absorbing member)
216: Second damper member (vibration absorbing member, second vibration absorbing member)
N: Nail (fastener)

What is claimed is:

1. A work machine comprising:
a pressure storage container with a pressure chamber inside that is filled with gas;
a striker that strikes a fastener by moving due to a pressure of the gas in the pressure chamber;
a communication passageway formed in the pressure storage container and configured to communicate with outside and inside of the pressure storage container;
a valve attached to the communication passageway configured to shut off a communication between the outside and the inside of the pressure storage container and to switch to a communication state that communicates between the outside and the inside of the pressure storage container, wherein the valve comprises:
(i) a valve core attached in the communication passageway and having an opening configured to communicate with the inside of the pressure chamber; and
(ii) a valve plug movably provided on the valve core, and disposed at a closed position to close the opening and to open the opening by moving from the closed position so as to place the valve in the communication state when the valve is activated; and
a switching inhibition mechanism provided in the pressure storage container and configured to inhibit the valve from switching to the communication state by holding the valve plug at the closed position.

2. The work machine according to claim 1,
wherein the communication passageway penetrates along a first direction,
wherein the valve is inserted into the communication passageway from one side in the first direction to be attached to the communication passageway, wherein the switching inhibition mechanism is configured as a stopper that regulates a movement of the valve to said one side in the first direction.

3. The work machine according to claim 2, wherein the stopper has a valve plug holding portion that fits with the valve plug in the closed position to hold the valve plug in the closed position.

4. The work machine according to claim 3, wherein the stopper is constituted of an elastic material having elasticity and presses the valve core toward other side in the first direction.

5. The work machine according to claim 1, wherein the switching inhibition mechanism comprises a vibration absorbing member provided between the communication passageway and the valve to absorb vibration received by the valve.

6. The work machine according to claim 5, wherein the communication passageway penetrates along a first direction, and wherein the vibration absorbing member comprises:

a first vibration absorbing member that absorbs vibration in a direction perpendicular to the first direction; and a second vibration absorbing member that absorbs vibration in the first direction.

7. The work machine according to claim 5, wherein the switching inhibition mechanism comprises an attachment member to which the valve is attached and disposed between the valve and the vibration absorbing member.

8. The work machine according to claim 7, wherein the communication passageway penetrates along a first direction, and wherein the vibration absorbing member comprises:

a first vibration absorbing member that absorbs vibration in a direction perpendicular to the first direction; and a second vibration absorbing member that absorbs vibration in the first direction.

9. A work machine comprising:

a pressure storage container with a pressure chamber inside that is filled with gas;

a striker that strikes a fastener by moving due to a pressure of the gas in the pressure chamber;

a communication passageway formed in the pressure storage container and configured to communicate with outside and inside of the pressure storage container;

a valve attached to the communication passageway configured to shut off a communication between the outside and the inside of the pressure storage container and to switch to a communication state that communicates between the outside and the inside of the pressure storage container; and a switching inhibition mechanism provided in the pressure storage container and maintains the valve in an inactive state and inhibits the valve from switching to the communication state, wherein the communication passageway penetrates along a first direction, wherein the valve is inserted into the communication passageway from one side in the first direction to be attached to the communication passageway, wherein the switching inhibition mechanism is configured as a stopper that regulates a movement of the valve to said one side in the first direction, wherein a cap is attached to one side portion in the first direction of the communication passageway to block the communication passageway, wherein the valve is attached to other side portion in the first direction of the communication passageway, and wherein the stopper is disposed between the cap and the valve.

10. The work machine according to claim 9, wherein the cap is provided with a fitted portion, wherein the stopper is provided with a fitting portion configured to be able to fit the fitted portion, and wherein the stopper is fixed to the cap by fitting the fitting portion to the fitted portion.

11. The work machine according to claim 9, wherein the valve comprises:

a valve core attached in the communication passageway and having an opening configured to communicate with the inside of the pressure chamber, a valve plug movably provided on the valve core, and disposed at a closed position to close the opening and to open the opening by moving from the closed position when the valve is activated, and wherein the stopper has a valve plug holding portion that fits with the valve plug in the closed position to hold the valve plug in the closed position.

12. The work machine according to claim 11, wherein the stopper is constituted of an elastic material having elasticity and presses the valve core toward other side in the first direction.

13. The work machine according to claim 10, wherein the valve comprises:

a valve core attached in the communication passageway and having an opening configured to communicate with the inside of the pressure chamber, a valve plug movably provided on the valve core, and disposed at a closed position to close the opening and to open the opening by moving from the closed position when the valve is activated, and wherein the stopper has a valve plug holding portion that fits with the valve plug in the closed position to hold the valve plug in the closed position.

14. The work machine according to claim 13, wherein the stopper is constituted of an elastic material having elasticity and presses the valve core toward other side in the first direction.

15. A work machine comprising:

a pressure storage container with a pressure chamber inside that is filled with gas;

a striker that strikes a fastener by moving due to a pressure of the gas in the pressure chamber;

a communication passageway formed in the pressure storage container and configured to communicate with outside and inside of the pressure storage container;

a valve attached to the communication passageway configured to shut off a communication between the outside and the inside of the pressure storage container and to switch to a communication state that communicates between the outside and the inside of the pressure storage container, wherein the valve comprises:

(i) a valve core attached in the communication passageway and having an opening configured to communicate with the inside of the pressure chamber; and (ii) a valve plug movably provided on the valve core, and disposed at a closed position to close the opening and to open the opening by moving from the closed position so as to place the valve in the communication state when the valve is activated; and a vibration absorbing member provided between the communication passageway and the valve core to absorb vibration received by the valve.

16. The work machine according to claim 15 comprising an attachment member to which the valve is attached and disposed between the valve and the vibration absorbing member.

17. The work machine according to claim 15, wherein the striker strikes the fastener by moving in a first direction, and wherein the valve switches from a state of shutting off the communication between the outside and the inside of the pressure storage container to the communication state by moving in the first direction.

18. The work machine according to claim 17, wherein the vibration absorbing member is provided at least in the first direction between the communication passageway and the valve.

19. The work machine according to claim 16, wherein the striker strikes the fastener by moving in a first direction, and wherein the valve switches from a state of shutting off the communication between the outside and the inside of the pressure storage container to the communication state by moving in the first direction.

20. The work machine according to claim 19, wherein the vibration absorbing member is provided at least in the first direction between the communication passageway and the valve.

* * * * *